(12) United States Patent
Lammers

(10) Patent No.: US 9,765,716 B2
(45) Date of Patent: Sep. 19, 2017

(54) HYBRID POWER SUPPLY SYSTEM AND METHOD OF SUPPLYING POWER FROM ENGINE

(71) Applicant: Caterpillar Inc., Peoria, IL (US)

(72) Inventor: Bryan G. Lammers, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/856,807

(22) Filed: Sep. 17, 2015

(65) Prior Publication Data

US 2017/0082050 A1    Mar. 23, 2017

(51) Int. Cl.
| | |
|---|---|
| *F02D 41/08* | (2006.01) |
| *F02D 13/02* | (2006.01) |
| *B60W 20/00* | (2016.01) |
| *F02D 31/00* | (2006.01) |
| *F02D 41/00* | (2006.01) |

(52) U.S. Cl.
CPC ............. *F02D 41/08* (2013.01); *B60W 20/00* (2013.01); *F02D 13/0203* (2013.01); *F02D 31/008* (2013.01); *F02D 31/009* (2013.01); *B60W 2710/065* (2013.01); *F02D 2041/0012* (2013.01); *Y10S 903/905* (2013.01); *Y10S 903/96* (2013.01)

(58) Field of Classification Search
CPC ...... F02D 41/08; F02D 13/0203; F02D 41/30; F02D 31/008; F02D 31/009; F02D 2041/0012; B60W 20/00; B60W 2710/065; Y10S 903/96; Y10S 903/905
See application file for complete search history.

(56) References Cited

U.S. PATENT DOCUMENTS

| | | |
|---|---|---|
| 4,625,823 A | 12/1986 | Frank |
| 7,689,331 B2 | 3/2010 | Moran |
| 8,446,037 B2 | 5/2013 | Williams |
| 2010/0280712 A1 | 11/2010 | Bowman |
| 2015/0148191 A1 | 5/2015 | Shepherd |

*Primary Examiner* — Mussa A Shaawat
*Assistant Examiner* — Michael Kerrigan
(74) *Attorney, Agent, or Firm* — James S. Bennin

(57) ABSTRACT

A hybrid power supply system for an engine is disclosed. The hybrid power supply system includes a sensing unit to generate a signal indicative of a speed of the engine and a controller to determine the speed of the engine based on the signal received from the sensing unit. The controller compares the speed of the engine with a predefined maximum idle speed, and cuts off a supply of fuel to the engine, when the speed of the engine is greater than or equal to the predefined maximum idle speed. The controller shuts off an inlet valve and an exhaust valve associated with a cylinder of the engine. The closure of the inlet valve and the exhaust valve allow compression and expansion of air within the cylinder during supply of a rotational power by a flywheel.

20 Claims, 4 Drawing Sheets

HYBRID POWER SUPPLY SYSTEM AND METHOD OF SUPPLYING POWER FROM ENGINE

TECHNICAL FIELD

The present disclosure relates to a hybrid power supply system for an engine and a method of supplying power from the engine.

BACKGROUND

Machines, for example, a wheel loader and a truck typically employ an engine for providing a power output for propelling the machines over a ground surface and for moving material. The engine includes a flywheel for storing a rotational energy and supplying a rotational power when an additional power is required for operation of the machines. Such utilization of the flywheel may also be accompanied by controlling the fuel consumption of the engine in order to improve the fuel efficiency. Although, intensive research work and developments have been witnessed in the automobile realm for improving the fuel efficiency of the engine by utilizing the kinetic energy stored in the flywheel, still there is a need to improve fuel efficiency of the engine by controlling various operating parameters of the engine as well as controlling components associated with the engine.

US Patent Publication Number 2010/0280712 (the '712 Patent) discloses a drive train for a hybrid vehicle having a flywheel-based energy storage and recovery system. The flywheel-based energy storage and recovery system can drive or be driven by input shaft of an automatic manual shift gearbox. The gearbox has an input shaft and an output shaft drivably connected to the input shaft to provide a number of drive ratios and operable to provide drive to at least one road wheel. However, the '712 patent discloses a first clutch and a second clutch connected to opposite ends of the input shaft. Further, the '712 patent is directed towards obtaining various drive ratios and providing drive to at least one road wheel. Also, the drive train disclosed in '712 is complex and expensive.

SUMMARY OF THE DISCLOSURE

In one aspect of the present disclosure, a hybrid power supply system for an engine is provided. The hybrid power supply system includes a sensing unit and a controller. The sensing unit is configured to generate a signal indicative of a speed of the engine. The controller is in communication with the sensing unit. The controller is configured to determine the speed of the engine based on the signal received from the sensing unit. Further, the controller is configured to compare the speed of the engine with a predefined maximum idle speed of the engine. The controller then cuts off a supply of fuel to the engine, when the speed of the engine is greater than or equal to the predefined maximum idle speed. Further, the controller is configured to shut off an inlet valve and an exhaust valve associated with a cylinder of the engine, wherein the inlet valve and the exhaust valve allow compression of air within the cylinder during supply of a rotational power by a flywheel.

In another aspect of the present disclosure, a method of supplying power from an engine is provided. The method includes receiving a signal indicative of a speed of the engine. The method also includes determining the speed of the engine based on the signal. The method further includes comparing the speed of the engine with a predefined maximum idle speed of the engine. The method furthermore includes cutting off a supply of fuel to the engine, when the speed of the engine is greater than or equal to the predefined maximum idle speed. The method includes shutting off an inlet valve and an exhaust valve associated with a cylinder of the engine.

In yet another aspect of the present disclosure, a machine is provided. The machine includes an engine and a sensing unit configured to generate a signal indicative of a speed of the engine. The machine further includes a controller in communication with the sensing unit. The controller is configured to determine the speed of the engine based on the signal received from the sensing unit and compare the speed of the engine with a predefined maximum idle speed of the engine. The controller is further configured to cut off a supply of fuel to the engine, when the speed of the engine is greater than or equal to the predefined maximum idle speed. The controller is further configured to shut off an inlet valve and an exhaust valve associated with a cylinder of the engine, wherein the inlet valve and the exhaust valve allow compression of air within the cylinder during supply of a rotational power by a flywheel.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
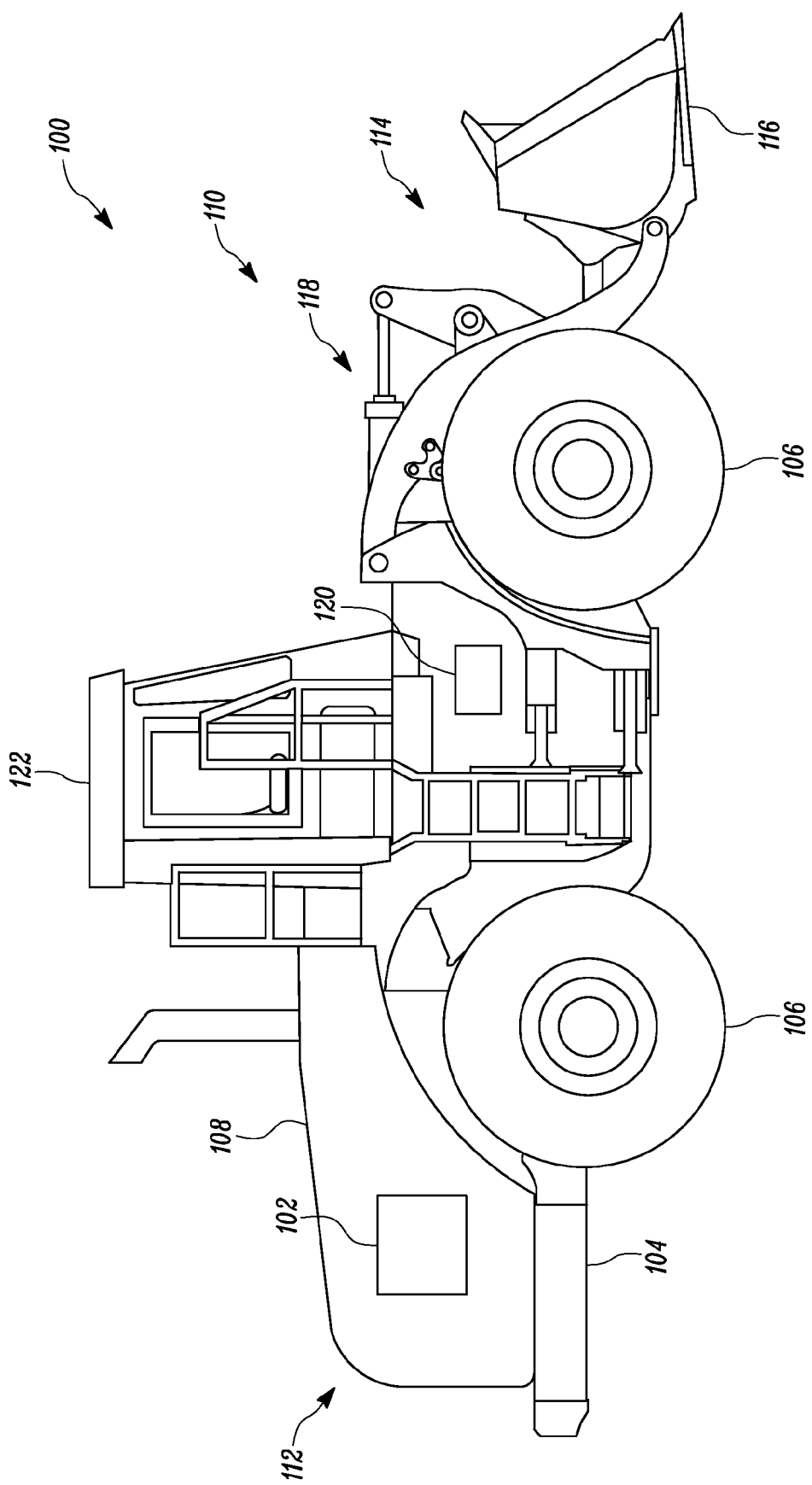
FIG. 1 is a side view of an exemplary machine having an engine, according to an embodiment of the present disclosure.

FIG. 1 illustrates a side view of an exemplary machine 100 having an engine 102, according to an embodiment of the present disclosure. In the illustrated embodiment, the machine 100 is a wheel loader. However, the machine 100 may alternatively be any other type of machine, for example, an on-highway machine, an off-highway machine, an earth moving equipment, a generator, an aerospace machine, a locomotive machine, a marine machine, or any other engine driven components used in various applications.

The machine 100 includes a chassis 104, a plurality of ground engaging members 106 for propelling the machine 100, a body 108 mounted on the chassis 104, and the engine 102 supported on the chassis 104. The plurality of ground engaging members 106 may be in contact with a ground surface for moving the machine 100 on the ground surface. In the illustrated embodiment, the plurality of ground engaging members 106 includes a set of wheels disposed each at a front end 110 and a rear end 112 of the machine 100. In another embodiment, the plurality of ground engaging members 106 may include tracks. In yet another embodiment, the plurality of ground engaging members 106 may include a combination of wheels and tracks.

In one embodiment, the engine 102 provides power to the plurality of ground engaging members 106 through a transmission unit (not shown). The transmission unit may be a continuously variable transmission (CVT). In an alternative embodiment, the engine 102 may power a regeneration unit (not shown), which operates motors driving the plurality of ground engaging members 106. The engine 102 may be an internal combustion engine that runs on fuels, such as diesel, gasoline, gaseous fuels, or any other type of fuel known in the art.

In the illustrated embodiment, the machine 100 includes an implement system 114 that further includes a bucket 116 disposed adjacent to the front end 110 of the machine 100. The machine 100 may also include a backhoe (not shown) disposed adjacent to the rear end 112 of the machine 100, or a blade disposed in place of the bucket 116, adjacent to the front end 110 of the machine 100. The bucket 116 may be moved by one or more hydraulic actuators 118. The hydraulic actuators 118 may communicate with a hydraulic system 120 of the machine 100 to move the bucket 116 relative to the chassis 104 based on an input from an operator.

The machine 100 further includes an operator station 122 for the operator to control operation of the machine 100. The operator station 122 may include a plurality of control equipment (not shown) for the operator to control the operation of the machine 100. The plurality of control equipment may include, but is not limited to, control levers, display devices for displaying information to the operator, and an electronic system for allowing the operator to electronically control various systems/components of the machine 100.

Figure 2:
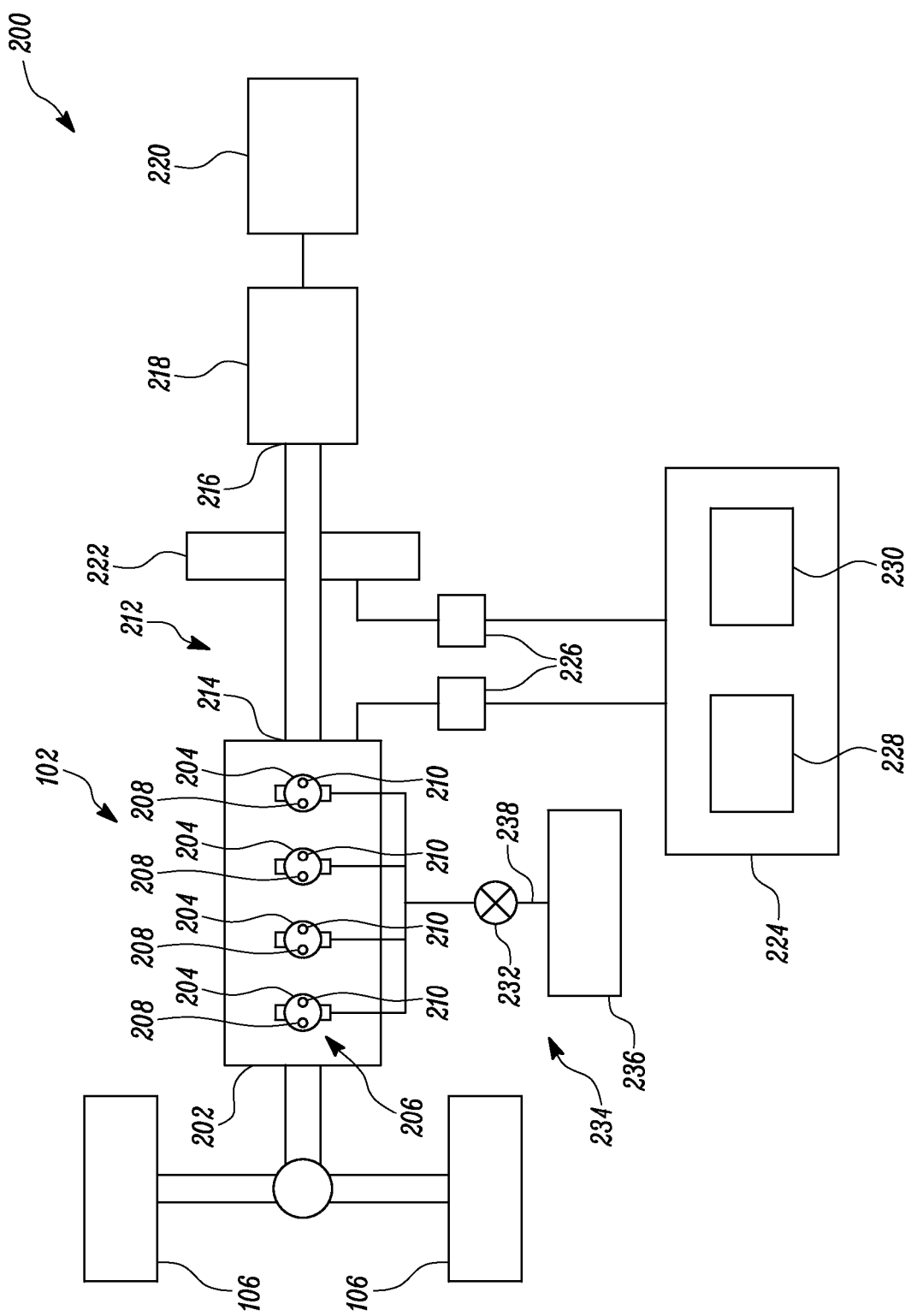
FIG. 2 is a schematic block diagram showing a hybrid power supply system for controlling an operation of the engine, according to an embodiment of the present disclosure.

FIG. 2 illustrates a schematic block diagram showing a hybrid power supply system 200 for controlling an operation of the engine 102, according to an embodiment of the present disclosure. The engine 102 includes an engine block 202 that further includes a plurality of cylinders 204. A piston (not shown) is slidably disposed within each of the plurality of cylinders 204 to reciprocate between an uppermost position (not shown) and a lowermost position (not shown) within the cylinder 204, and thereby rotate a crank shaft (not shown). During a stroke of the piston, the piston may move between the uppermost position and the lowermost position of the cylinder 204. A cylinder head (not shown) is further mounted on the engine block 202. The plurality of cylinders 204, the pistons, and the cylinder head may define a combustion chamber (not shown) for receiving fuel therein during a combustion process.

The engine 102 further includes a valve arrangement 206 for each of the plurality of cylinders 204 to control a flow of inlet gases in the plurality of cylinders 204, a flow of exhaust gases from the plurality of cylinders 204, and a flow of fuel into the combustion chambers of the plurality of cylinders 204. More specifically, the valve arrangement 206 includes an inlet valve 208 and an exhaust valve 210. In other embodiments, the valve arrangement 206 may include multiple inlet valves 208 and multiple exhaust valves 210. Each of the inlet valve 208 and the exhaust valve 210 independently moves to define a closed position and a normal position of the engine 102. In the normal position of the engine 102, the inlet valve 208 and the exhaust valve 210 allow an entry of air into the cylinder 204 and an exit of the exhaust gases from the cylinder 204. For example, the inlet valve 208 may open so as to receive the air into the combustion chamber while the exhaust valve 210 stays closed. During the combustion of the fuel, the inlet valve 208 and the exhaust valve 210 stay closed. Once the combustion of the fuel has occurred, the exhaust valve 210 may open so as to allow an exit of the exhaust gases from the cylinder 204. In the closed position of the engine 102, the inlet valve 208 and the exhaust valve 210 prevent entry of air into the cylinder 204 and exit of the exhaust gases from the cylinder 204. For example, the inlet valve 208 and the exhaust valve 210 may be closed and therefore, may block the entry of the fuel into the cylinder 204 and the exit of the exhaust gases from the cylinder 204.

The engine 102 may further include various components, for example, an air filter (not shown) and a turbo charger (not shown) may be disposed in intake and exhaust lines (not shown), which may serve as a conduit for the air to pass through, to and from the engine 102. Referring to FIG. 2, the engine 102 is an inline-type engine having multiple cylinders 204. However, it may be contemplated that the multiple cylinders 204 may be arranged in various configurations including, but not limited to, a V-type configuration, a radial configuration, a rotary configuration or the like.

Referring to FIG. 2, the hybrid power supply system 200 (hereinafter referred to as "the system 200") includes an output shaft 212 having a first end 214 and a second end 216 distal to the first end 214. The first end 214 of the output shaft 212 is connected to the engine 102. More specifically, the first end 214 of the output shaft 212 may be connected to the crank shaft of the engine 102 to receive a rotational power therefrom. The system 200 further includes a generator unit 218 connected to the second end 216 of the output shaft 212. Also, a motor 220 is connected to the generator unit 218 to drive each of the plurality of ground engaging members 106. A hydraulic pump (not shown) associated with the hydraulic system 120 may be driven from the generator unit 218. The hydraulic pump may also be coupled to the output shaft 212 from any location in the machine 100.

The system 200 further includes a flywheel 222 coupled to the engine 102 via a transmission system, such as the output shaft 212. The flywheel 222 is drivably coupled to the output shaft 212. In other embodiments, the transmission system may include a gear drive or any other coupling mechanism known in the art. The flywheel 222 is adapted to obtain rotational energy from the engine 102. The flywheel 222 is configured to supply the rotational energy stored therein to various systems of the machine 100. In an example, the rotational energy may be used for driving the hydraulic pump associated with the hydraulic system 120 of the machine 100. The hydraulic system 120 may further communicate with the implement system 114 of the machine 100.

During a "normal operation" of the engine 102, the fuel is delivered to the engine 102 and combustion of the fuel takes place in the cylinders 204 as the inlet valves 208 and the exhaust valves 210 open and shut. Further, the pistons move between the uppermost position and the lowermost position to rotate the crank shaft of the engine 102, which in turn rotates the output shaft 212 of the engine 102. The flywheel 222 connected to the output shaft 212 also rotates at a speed of the crank shaft. During rotation, the flywheel 222 may store the rotational energy, known as a kinetic energy, due to rotational moment of inertia.

Referring to FIG. 2, the system 200 includes a controller 224 and a sensing unit 226. The sensing unit 226 is configured to be in communication with the controller 224. The sensing unit 226 is configured to generate a signal 'S1' indicative of a speed of the engine 102. More specifically, the sensing unit 226 may generate the signal 'S1' indicative of the speed of the engine 102 during a specific duration. The specific duration may correspond to a time period for which the machine 100 may be either moving or stationary and may perform earth moving operations by the implement system 114. A work cycle of the earth moving operation may include various segments, such as digging, lifting and dumping segments.

The sensing unit 226 is disposed in the machine 100 and is in communication with the engine 102 to generate the signal indicative of the speed of the engine 102. In one example, the sensing unit 226 may be disposed on or adjacent to the flywheel 222 to generate the signal indicative of the speed of the engine 102. In another example, the sensing unit 226 may be disposed at any location in the engine 102 to determine the speed of the engine 102. In yet another example, the sensing unit 226 may include multiple sensors, such as temperature sensors, pressure sensors, speed sensors and other known sensors for detecting various operating parameters, such as temperatures of various components of the engine 102 or fluids used in the engine 102, and pressures of the fluids for generating a signal indicative of the various operating parameters of the engine 102. The speed of the engine 102 may be determined based on the various operating parameters of the engine 102. The sensing unit 226 may also be configured to generate a signal indicative of a torque output of the engine 102, during the work cycle of the machine 100. The signal corresponding to the torque output of the engine 102 may be communicated to the controller 224. The signal 'S1' generated by the sensing unit 226 is communicated to the controller 224. In one example, the controller 224 may be located in the operator station 122 of the machine 100. In another example, the controller 224 may be disposed at any location in the machine 100.

In an example, the controller 224 may embody a single microprocessor or multiple microprocessors for receiving signals from the sensing unit 226 related to various operating parameters of the machine 100. Commercially available microprocessors may be configured to perform functions of the controller 224. The controller 224 may also embody a machine microprocessor for controlling various machine operating parameters. The controller 224 may also be configured to receive inputs from the operator via a user interface (not shown).

The controller 224 includes a memory module 228 and a processing module 230 in communication with the memory module 228. The memory module 228 of the controller 224 may include a database for storing operating parameters of the engine 102, mathematical models, and/or any other control logic. The memory module 228 may contain reference values, such as a maximum idle speed of the engine 102, an average idle speed of the engine 102, and a minimum idle speed of the engine 102 related to various earth moving operations of the machine 100.

The processing module 230 may be configured to determine the speed of the engine 102 based on the signal received from the sensing unit 226. The processing module 230 may also be configured to be in communication with the temperature sensors, the pressure sensors and the speed sensors for determining the operating parameters of the engine 102 based on the signal received from the sensing unit 226. The processing module 230 may also be configured to compare the speed and other operating parameters of the engine 102 with the reference values stored in the memory module 228.

The system 200 further includes a control valve 232 disposed in a fuel supply system 234 of the engine 102. The fuel supply system 234 includes a fuel tank 236, at least one pump (not shown), and a fuel line 238. The pump may supply the fuel from the fuel tank 236 to the cylinders 204 through the fuel line 238. The control valve 232 is disposed in the fuel line 238 between the fuel tank 236 and the cylinders 204 of the engine 102. The control valve 232 is configured to allow or restrict the supply of the fuel into the cylinders 204. More specifically, the control valve 232 is configured to be actuated in order to allow the supply of the fuel into the cylinders 204 or to restrict the supply of the fuel into the cylinders 204. The control valve 232 is further configured to communicate with the controller 224, such that the controller 224 may send a signal to the control valve 232. Based on the signal from the controller 224, the control valve 232 may be closed or opened for restricting or allowing the supply of the fuel into the cylinders 204, respectively. In one example, the control valve 232 may be a solenoid valve that may be actuated based on an electric power. In other examples, the control valve 232 may be actuated via a hydraulic power, a pneumatic power, a mechanical power, or a combination thereof based on the signal from the controller 224.

INDUSTRIAL APPLICABILITY

The present disclosure relates to the system 200 for supplying power from the engine 102. The system 200 includes the sensing unit 226 and the controller 224 for controlling the supply of power from the engine 102 by cutting off the supply of the fuel into the cylinder 204 of the engine 102 and shutting off or opening up the inlet valve 208 and the exhaust valve 210 based on the speed of the engine 102.

Figure 3:
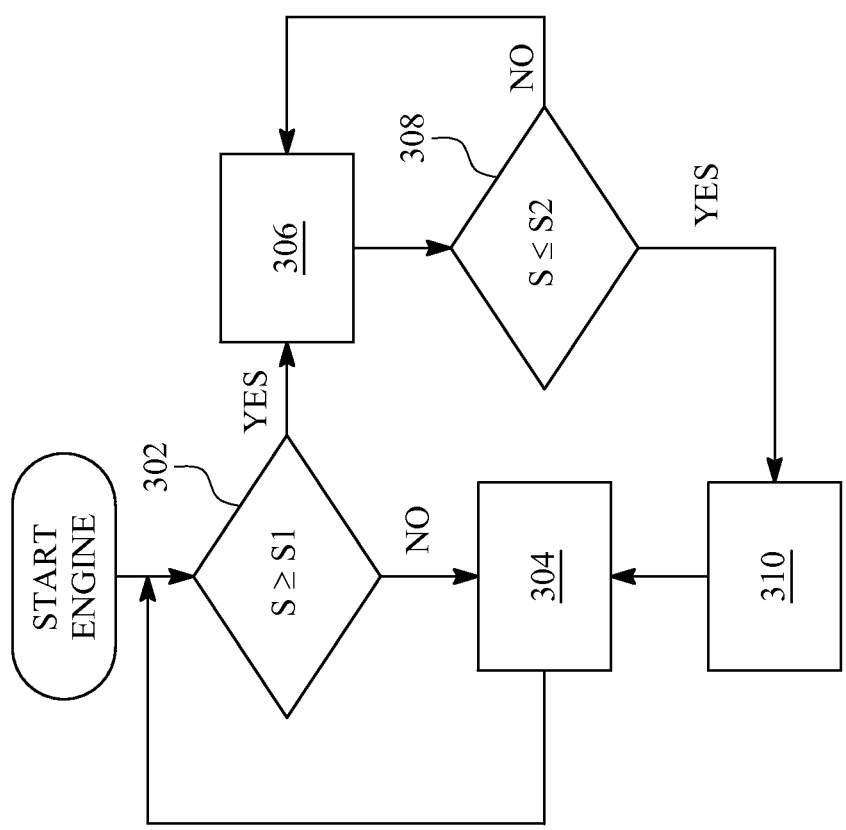
FIG. 3 is a flowchart of a method of operating the engine for supplying power therefrom, according to an embodiment of the present disclosure.

FIG. 3 illustrates a flowchart of a method 300 of operating the engine 102 for supplying power therefrom, according to an embodiment of the present disclosure. Once the engine 102 starts, the sensing unit 226 generates the signal indicative of the speed of the engine 102. The controller 224 in communication with the sensing unit 226 receives the signal from the sensing unit 226 and determines the speed of the engine 102.

At block 302, the method 300 includes comparing the speed of the engine 102 with a predefined maximum idle speed 'S1' of the engine 102. The predefined maximum idle speed of the engine 102 is stored in the memory module 228 of the controller 224. The processing module 230 may compare the speed 'S' of the engine 102 with the predefined maximum idle speed 'S1'. When the speed of the engine 102 is less than the predefined maximum idle speed 'S1', the method 300 branches to block 304.

At block 304, the controller 224 is configured to increase the speed of the engine 102 to the predefined maximum idle speed 'S1'. More specifically, the controller 224 may be in communication with the fuel supply system 234 of the engine 102 to increase the speed of the engine 102 by increasing the supply of the fuel into the cylinders 204 of the engine 102. The controller 224 may actuate the fuel supply system 234 based on the signal received from the sensing unit 226 and the additional sensors disposed on the engine 102 to increase the speed of the engine 102 to the predefined maximum idle speed 'S1'.

When the supply of fuel is cut off and the inlet valve 208 and the exhaust valve 210 are shut off, the sensing unit 226 is configured to generate a signal indicative of a speed of the engine 102. The controller 224 is further configured to receive the signal from the sensing unit 226, and to determine the speed of the engine 102 when the fuel supply is cut off and the inlet valves 208 and the exhaust valves 210 are shut off. After block 304, the method 300 branches back to block 302.

Referring to block 302, when the speed 'S' of the engine 102 is greater than or equal to the predefined maximum idle speed 'S1', the method 300 branches to block 306. At block 306, the controller 224 is configured to communicate with the control valve 232 to cut off the supply of the fuel into the cylinder 204 of the engine 102. Simultaneously, the controller 224, in communication with the inlet valve 208 and the exhaust valve 210 of the valve arrangement 206 of each of the cylinders 204, is also configured to shut off the inlet valve 208 and the exhaust valve 210. The controller 224 may move the inlet valve 208 and the exhaust valve 210 associated with each of the cylinders 204 to the closed position to prevent entry of air into the cylinder 204 and/or exit of gas from the cylinder 204. During the closed position, the inlet valve 208 and the exhaust valve 210 allow compression and expansion of the air within each of the cylinders 204 during supply of the rotational power by the flywheel 222. In an example, the controller 224 may electrically actuate the inlet valve 208 and the exhaust valve 210 to the closed position, when the supply of the fuel to the engine 102 is cut off.

Once the supply of the fuel is cut off and the inlet valve 208 and the exhaust valve 210 are shut off, the rotational energy stored in the flywheel 222 may be used to supply the rotational power from the engine 102. In such a case, the piston of each of the cylinders 204 may move between the uppermost position and the lowermost position therein due to rotation of the flywheel 222. Further, the air available in the cylinder 204 may also compress and expand due to the movement of the piston within the cylinder 204 during supply of the power through the inertia of rotating components, such as the flywheel 222 of the engine 102. In an example, the signals from the sensing unit 226 are indicative of the speed of the engine 102 during the duration of the fuel cut off and closure of the inlet and exhaust valves 208, 210.

At block 308, the controller 224 is configured to compare the speed of the engine 102 with a predefined minimum idle speed 'S2' of the engine 102. The predefined minimum idle speed 'S2' of the engine 102 is stored in the memory module 228 of the controller 224. The processing module 230 may compare the speed 'S' of the engine 102 with the predefined minimum idle speed 'S2'. When the speed 'S' of the engine 102 is greater than the predefined minimum idle speed 'S2', the method 300 branches back to block 306. When the speed 'S' of the engine 102 is less than or equal to the predefined minimum idle speed 'S2', the method 300 branches to block 310.

At block 310, the controller 224 is configured to communicate with the control valve 232 to allow the supply of the fuel into the cylinder 204 of the engine 102. Simultaneously, the controller 224 is configured to actuate the inlet valve 208 and the exhaust valve 210 to the "normal operation" mode to allow entry of air into the cylinder 204 and/or exit of the exhaust gas from the cylinder 204. In such a case, since the flywheel 222 is already in rotation, the engine 102 starts operating in a normal manner.

Figure 4:
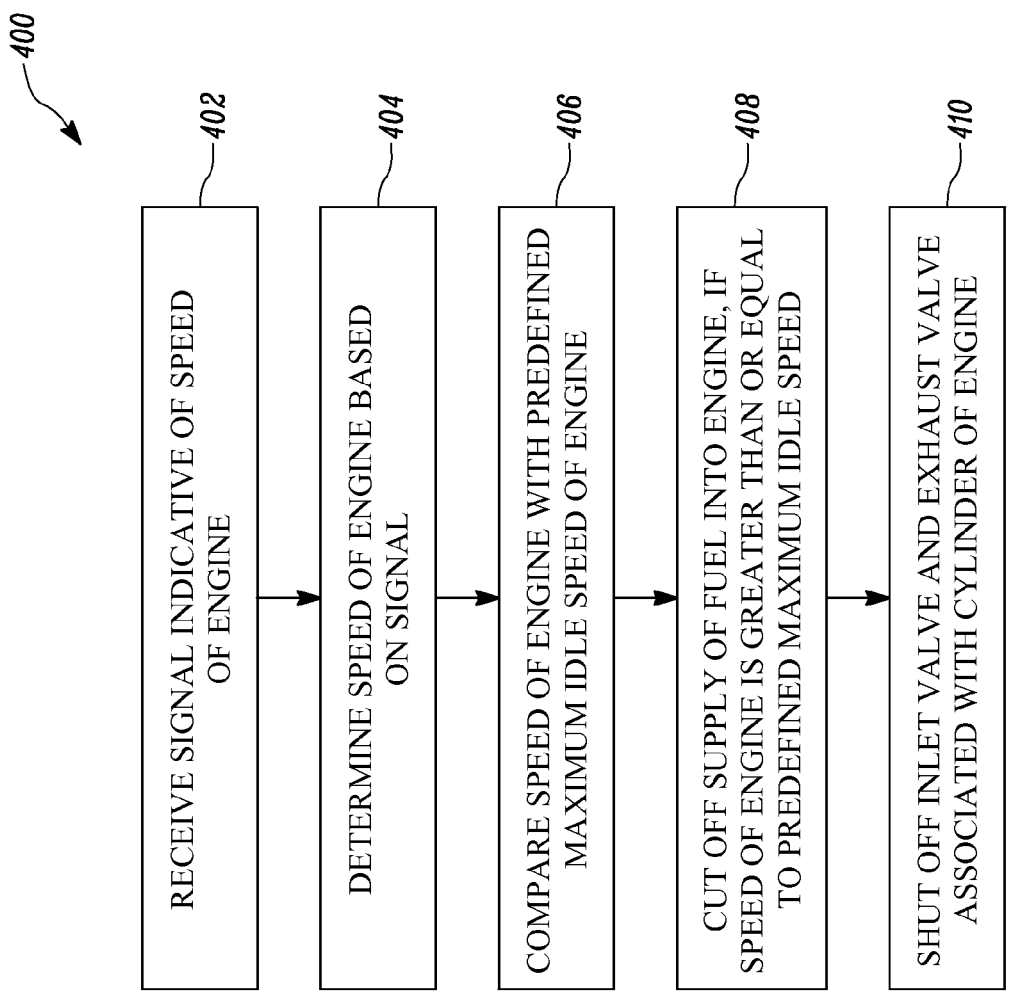
FIG. 4 is a flowchart of a method of supplying power from the engine, according to another embodiment of the present disclosure.

FIG. 4 illustrates a flowchart of the method 400 of supplying power from the engine 102, according to another embodiment of the present disclosure. At block 402, the method 400 includes receiving the signal indicative of the speed of the engine 102. The sensing unit 226, in communication with the engine 102, may generate the signal indicative of the speed of the engine 102 and various other operating parameters of the engine 102.

At block 404, the method 400 includes determining the speed of the engine 102 based on the signal. The controller 224, in communication with the sensing unit 226, receives the signal from the sensing unit 226 and determines the speed of the engine 102. The processing module 230 of the controller 224 may process the signal to determine the speed of the engine 102.

At block 406, the method 400 includes comparing the speed of the engine 102 with the predefined maximum idle speed 'S1' of the engine 102. The controller 224 may compare the speed of the engine 102 with the predefined maximum idle speed 'S1' stored in the memory module 228 of the controller 224. The predefined maximum idle speed 'S1' of the engine 102 may be reset before the start of the operation of the engine 102 or the machine 100.

At block 408, the method 400 includes cutting off the supply of the fuel to the engine 102, when the speed of the engine 102 is greater than or equal to the predefined maximum idle speed 'S1'. The controller 224 may actuate the control valve 232 disposed on the fuel supply system 234 of the engine 102 to cut off the supply of the fuel to the engine 102.

At block 410, the method 400 includes shutting off the inlet valve 208 and the exhaust valve 210 associated with each of the cylinders 204 of the engine 102, when the supply of the fuel to the engine 102 is cut off. The controller 224, in communication with the inlet valve 208 and the exhaust valve 210, may move the inlet valve 208 and the exhaust valve 210 to the closed position. The method 400 further includes allowing compression and expansion of the air within the cylinder 204 during the supply of the rotational power by the flywheel 222, when the fuel is cut off and the inlet valve 208 and the exhaust valve 210 are shut off.

The method 400 further includes, increasing the speed of the engine 102 to the predefined maximum idle speed, when the speed of the flywheel 222 is less than the predefined maximum idle speed 'S1'. At a subsequent block, the method 400 includes receiving the signal indicative of the speed of the engine 102, when the supply of the fuel to the engine 102 is cut off and the inlet valve 208 and the exhaust valve 210 are shut off. Further, the method 400 includes determining the speed of the engine 102 when the supply of the fuel into a cylinder 204 of the engine 102 is cut off. The speed of the engine 102 is then compared with the predefined minimum idle speed 'S2' of the engine 102. Further, the method 400 includes supplying the fuel to the engine 102, when the speed of the engine 102 is less than or equal to the predefined minimum idle speed 'S2' and actuating the inlet valve 208 and the exhaust valve 210 to operate in the "normal operation" mode.

In an embodiment, the system 200 and the methods 300, 400 of the present disclosure enable utilization of a rotational energy stored in the flywheel 222. More specifically, since the system 200 and the methods 300, 400 control the supply of power from the engine 102 by cutting off the supply of the fuel into the cylinder 204 of the engine 102 and shutting off the inlet valve 208 and the exhaust valve 210, a better fuel economy of the engine 102 may be achieved. Further, when the inlet valve 208 and the exhaust valve 210 are shut off, the flywheel 222 provides the power to the machine 100. This may assist in a reduced consumption of fuel by the engine 102 in comparison to the instances where the fuel is continuously supplied to the engine 102. Moreover, by shutting off the inlet valve 208 and the exhaust valve 210, the controller 224 of the system 200 may assist in reducing pumping losses that may occur with a rotation of the crank shaft of the engine 102 connected with the flywheel 222. Therefore, the present disclosure offers the system 200 and the methods 300, 400 for controlling operations of the engine 102 that are simple, effective, and provide economic gains.

A computer program code for implementing the method 300 according to the invention may be suitably included in a computer program, which is loadable into the internal memory of a computer, such as the internal memory of an electronic control unit of the machine 100. Such a computer program is suitably provided via a computer product comprising a code and data storage medium readable by the electronic control unit. The code and data storage medium may be, for example, ROM, PROM, EPROM, EEPROM, or a Flash memory or the like.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hybrid power supply system for an engine, the hybrid power supply system comprising:
   a flywheel storing rotational energy obtained from the engine;
   a sensing unit configured to generate a signal indicative of a speed of the engine; and
   a controller in communication with the sensing unit, the controller configured to:
      determine the speed of the engine based on the signal received from the sensing unit;
      compare the speed of the engine with a predefined maximum idle speed of the engine;
      cut off a supply of fuel to the engine, when the speed of the engine is greater than or equal to the predefined maximum idle speed; and
      shut off an inlet valve and an exhaust valve associated with a cylinder of the engine when the supply of the fuel to the engine is cut off,
      wherein the flywheel supplies a rotational power, from the rotational energy, to the engine when the inlet valve and the exhaust valve are shut off, and wherein the inlet valve and the exhaust valve allow compression of air within the cylinder during supply of the rotational power by the flywheel.

2. The hybrid power supply system of claim 1, wherein the flywheel is coupled to the engine via a transmission system, and wherein the flywheel is configured to supply the rotational energy, when the fuel is cut off and the inlet valve and the exhaust valve are shut off.

3. The hybrid power supply system of claim 1, further comprising a control valve disposed in a fuel supply system of the engine, the control valve configured to control the supply of the fuel to the engine.

4. The hybrid power supply system of claim 3, wherein the controller is configured to communicate with the control valve to cut off the supply of the fuel to the engine.

5. The hybrid power supply system of claim 1, wherein the controller is configured to communicate with the inlet valve and the exhaust valve of the cylinder to move the inlet valve and the exhaust valve to a closed position, when the supply of the fuel to the engine is cut off.

6. The hybrid power supply system of claim 1, wherein the controller is configured to increase the speed of the engine to the predefined maximum idle speed, when the speed of the engine is less than the predefined maximum idle speed.

7. The hybrid power supply system of claim 1, wherein the controller is further configured to:
   receive, via the sensing unit, a signal indicative of a speed of the engine, when the supply of the fuel to the engine is cut off;
   determine the speed of the engine, when the supply of the fuel to the engine is cut off;
   compare the speed of the engine with a predefined minimum idle speed of the engine;
   allow the supply of the fuel to the engine, when the speed of the engine is less than or equal to the predefined minimum idle speed; and
   actuate the inlet valve and the exhaust valve to a normal position.

8. A method of supplying power from an engine, the method comprising:
   receiving a signal indicative of a speed of the engine;
   determining the speed of the engine based on the signal;
   comparing the speed of the engine with a predefined maximum idle speed of the engine;
   cutting off a supply of fuel to the engine, when the speed of the engine is greater than or equal to the predefined maximum idle speed; and
   shutting off an inlet valve and an exhaust valve associated with a cylinder of the engine, when the supply of fuel to the engine is cut off,
      wherein a flywheel, associated with the engine, supplies a rotational power to the engine when the inlet valve and the exhaust valve are shut off.

9. The method of claim 8 further comprising allowing compression of air within the cylinder during supply of the rotational power by a flywheel, and when the fuel is cut off and the inlet valve and the exhaust valve are shut off.

10. The method of claim 8 further comprising communicating with a control valve disposed in a fuel supply system of the engine to cut off the supply of the fuel to the engine.

11. The method of claim 8 further comprising communicating with the inlet valve and the exhaust valve of the cylinder to move the inlet valve and the exhaust valve to a closed position, when the supply of the fuel to the engine is cut off.

12. The method of claim 8 further comprising increasing the speed of the engine to the predefined maximum idle speed, when the speed of the engine is less than the predefined maximum idle speed.

13. The method of claim 8 further comprising:
   receiving a signal indicative of a speed of the engine, when the supply of the fuel to the engine is cut off;
   determining the speed of the engine based on the signal;
   comparing the speed with a predefined minimum idle speed of the engine;
   supplying the fuel to the engine, when the speed of the engine is less than or equal to the predefined minimum idle speed; and
   actuating the inlet valve and the exhaust valve to a normal position.

14. A machine comprising:
   an engine;
   a sensing unit configured to generate a signal indicative of a speed of the engine; and
   a controller in communication with the sensing unit, the controller configured to:

determine the speed of the engine based on the signal received from the sensing unit;

compare the speed of the engine with a predefined maximum idle speed of the engine;

cut off a supply of fuel to the engine, when the speed of the engine is greater than or equal to the predefined maximum idle speed; and shut off an inlet valve and an exhaust valve associated with a cylinder of the engine when the supply of the fuel to the engine is cut off, wherein the flywheel supplies a rotational power to the engine when the inlet valve and the exhaust valve are shut off, and wherein the inlet valve and the exhaust valve allow compression of air within the cylinder during supply of a rotational power by a flywheel.

15. The machine of claim 14, wherein the flywheel is coupled to the engine via a transmission system, and wherein the flywheel is configured to supply a rotational energy when the fuel is cut off and the inlet valve and the exhaust valve are shut off, the rotation energy being stored by the flywheel.

16. The machine of claim 14, further comprising a control valve disposed in a fuel supply system of the engine, the control valve configured to control the supply of the fuel to the engine.

17. The machine of claim 16, wherein the controller is configured to communicate with the control valve to cut off the supply of the fuel to the engine.

18. The machine of claim 14, wherein the controller is configured to communicate with the inlet valve and the exhaust valve of the cylinder to move the inlet valve and the exhaust valve to a closed position, when the supply of the fuel to the engine is cut off.

19. The machine of claim 14, wherein the controller is configured to increase the speed of the engine to the predefined maximum idle speed, when the speed of the engine is less than the predefined maximum idle speed.

20. The machine of claim 14, wherein the controller is further configured to:

receive a signal, via the sensing unit, indicative of a speed of the engine, when the supply of the fuel to the engine is cut off;

determine the speed of the engine, when the supply of the fuel to the engine is cut off;

compare the speed of the engine with a predefined minimum idle speed of the engine;

allow the supply of the fuel to the engine, when the speed of the engine is less than or equal to the predefined minimum idle speed; and actuate the inlet valve and the exhaust valve to a normal position.

* * * * *